Sept. 3, 1946. L. A. SERRANO 2,406,913
CARBURATION SYSTEM FOR INTERNAL-COMBUSTION ENGINES
Filed June 26, 1942 2 Sheets-Sheet 1

*Inventor:*
LIBERTO ALFONSO SERRANO
By George H. Corley
*Attorney*

Sept. 3, 1946.　　　　L. A. SERRANO　　　　2,406,913
CARBURATION SYSTEM FOR INTERNAL-COMBUSTION ENGINES
Filed June 26, 1942　　　2 Sheets-Sheet 2

Inventor:
LIBERTO ALFONSO SERRANO
By George H. Corey
Attorney

Patented Sept. 3, 1946

2,406,913

UNITED STATES PATENT OFFICE 2,406,913

CARBURATION SYSTEM FOR INTERNAL-COMBUSTION ENGINES

Liberto Alfonso Serrano, Barcelona, Spain

Application June 26, 1942, Serial No. 448,569
In Spain March 12, 1942

3 Claims. (Cl. 261—15)

The invention has for one of its objects to insure that there will be no opportunity for condensation of the superheated vapors of the heavy liquid fuel due to their mingling with cooler combustion air prior to their introduction into the engine cylinders while at the same time increasing the degree of pre-heat.

It is another object of the invention to provide valve controls, for the feeding of the liquid fuel to the vaporizing and superheating zone and for feeding the superheated vapors to the engine cylinders in advance of the carburetor, that are arranged for coordinated operation with the throttle valve so that the amount of liquid fuel fed to the superheater and the gasified vapors produced therefrom correspond at all times very closely with the demand, and consequently the amount of heavy fuel vapors that can condense in the feed line and in the superheater during shutdowns is maintained at a minimum.

It is a still further object of the invention to improve the feeding of light fuel to the engine during starting and in building up the heat exchange capacity of the vaporizing and superheating unit due to the feed of the lighter liquid fuel through the carburetor to the engine, or through the carburetor and also through the vaporizing and superheating system and then directly to the engine by by-passing the carburetor, until the heat content of the accumulating elements of the heat exchange unit has reached a point where vaporizing and superheating of the heavier liquid fuel will be assured when it is passed therethrough.

Further objects and advantages of the invention will appear from the appended description and the drawings, in which.

Figures 3, 6:
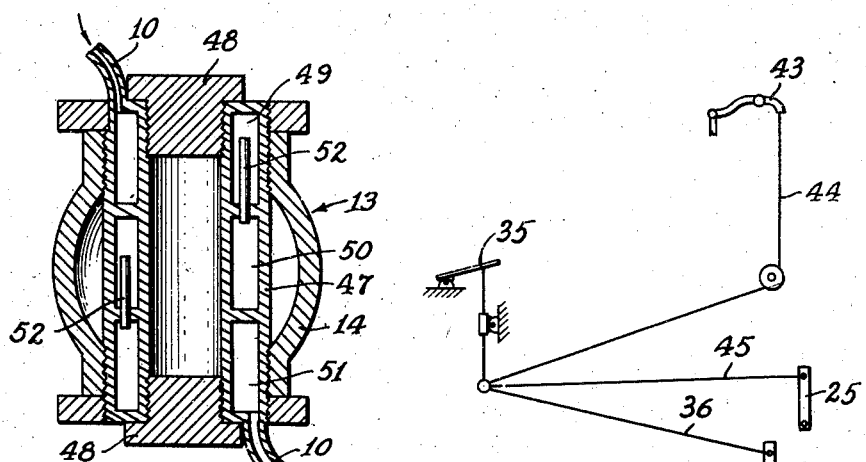
Fig. 3 is a vertical cross-section on the line 3—3 of Fig. 1 through the heat exchange device and its dispositions in the exhaust pipe that insures the desired superheating of the liquid fuel vapors circulated through the fuel feed line from the receiving receptacle 8 to the intake manifold.
Figure 2:
Fig. 2 is a longitudinal vertical section through the engine exhaust manifold showing in side elevation the pre-heating and vaporizing coil disposed therein.
Figure 4:
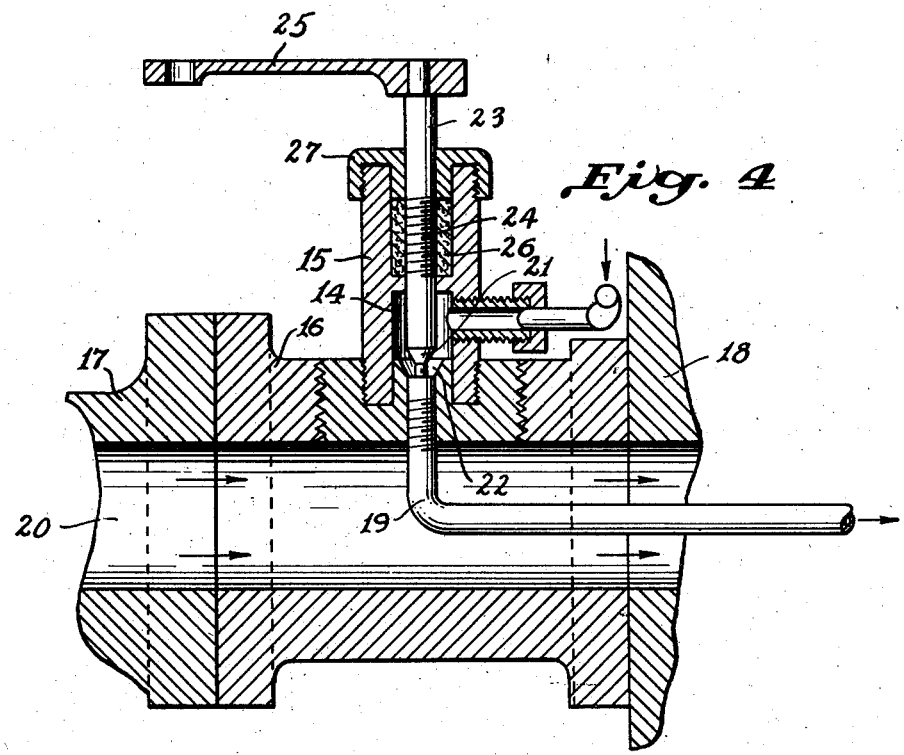
Fig. 4 is a vertical section through the conduit connecting the carburetor with the engine intake manifold and showing the special arrangements for introducing the superheated fuel vapors directly into the engine intake manifold in advance of the carburetor.
Figure 5:
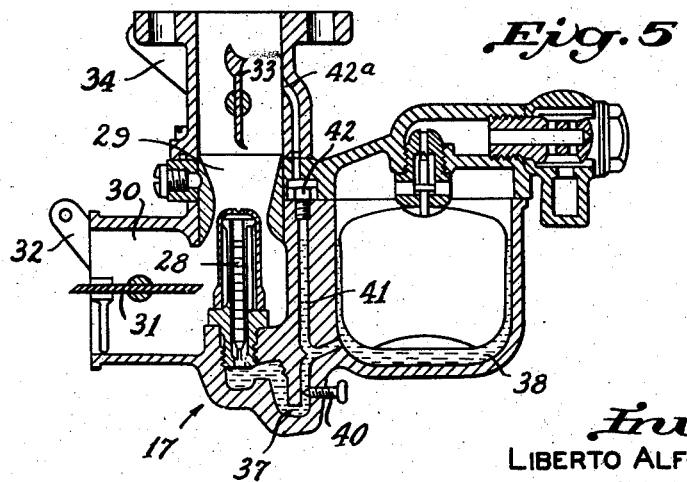

Fig. 5 is a vertical longitudinal section through the carburetor and the light fuel supply chamber associated therewith; and Fig. 6 is a diagrammatic showing of the connections between the accelerator pedal and the several valve control levers that insure the simultaneous actuation of the throttle valve and the valves controlling the feeding of fuel to and through the fuel vaporizing line to the intake manifold.

Figure 1:
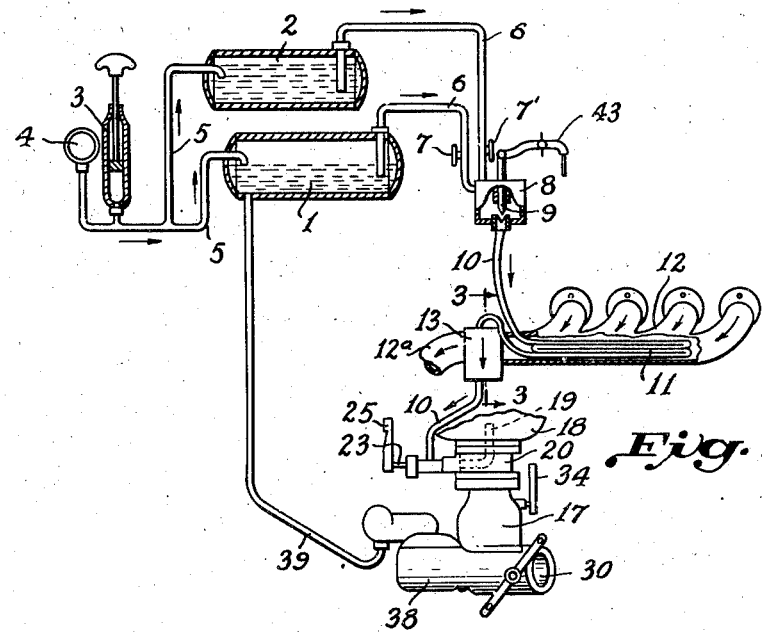
Fig. 1 is a diagrammatic view of the system as applied to a conventional four-cylinder engine, with only the directly coacting parts of the engine shown in the drawings.

As shown in Fig. 1, the system includes supply tanks 1 and 2 for the light liquid fuel and the heavy liquid fuel, respectively. Air pressure is provided in both of these tanks by the pump 3 under control of the gauge 4, the air being led to the tanks by the conduits 5. Liquid fuel is led from the tanks 1 and 2, selectively or in desired proportions, through the conduits 6, past the valves 7 and 7' to the feed tank or bowl 8. From the feed tank 8 the fuel is led past the needle valve 9 to the fuel line 10 to the pre-heating and vaporizing coil 11 disposed in the exhaust manifold 12 and then to the further heat exchange unit 13 disposed in the exhaust pipe 12a where the fuel is completely vaporized and the vapors acquire a high degree of superheat. From the unit 13 the highly heated gasiform vapors pass through the continuation of the feed line 10 to the valve chamber 14 formed by the member 15 which is secured in the side wall of the pipe coupling member 16. This member 16 is interposed between the carburetor 17 and the intake manifold 18. Connected with the valve chamber 14 is a pipe 19 which is bent at right angles and extends centrally of the passage 20 toward and into the intake manifold 18. Flow of superheated fuel vapors from valve chamber 14 to the pipe 19 is controlled by the valve 21 seated at 22 and carried by the valve stem 23. The valve stem 23 is threaded at 24 to enable it to be screwed inwardly and outwardly when rotated by the lever 25. As shown, the threaded portion 24 is disposed in a stuffing box 26 filled with a suitable packing, for example asbestos, that has been compressed and rendered homogeneous. Access to the stuffing box is had by removing the cap 27.

As shown in greater detail in Fig. 5, the carburetor 17 includes a conventional atomizing nozzle 28 discharging into the mixing chamber 29 to which air is led from the air inlet 30 controlled by the choke valve 31 actuated by the lever 32. The usual throttle valve 33 is mounted adjacent the outlet of the mixing chamber for actuation by the lever 34 connected to the accelerator pedal 35 through suitable linkage connections, shown diagrammatically at 36 (see Fig. 6). The atomizing nozzle 28 is connected by the conduit 37 with the liquid fuel reservoir 38 formed within the carburetor housing and having direct connection with the light fuel tank 1 by means of the fuel line 39.

Feeding of gasoline or other light fuel through the conduit 37 to the nozzle 28 is regulated by the valve 40, it being understood that this valve will be open for feeding liquid to the nozzle 28 when the engine is being started, but that normally the valve will be closed after the heat exchange coil 11 and the unit 13 have become highly heated and the supply of fuel has been switched to the fuel feed line 10.

As shown in Figs. 1 and 5, the throttle valve 33 is disposed adjacent the outlet end of the mixing chamber of the carburetor. Also connecting with the reservoir 38 is a second conduit 41 leading to the idling jet 42 discharging into the passage 20 in advance of the throttle valve 33. It will be understood that flow through this nozzle will not take place so long as the throttle valve 33 is open and air or mixed air and fuel vapors are being freely sucked in from the carburetor mixing chamber. Upon closing of the throttle valve flow to the idling jet or nozzle 42 will be automatically set up and maintained so long as the engine continues to operate in an idling manner.

As shown more particularly in Figs. 1 and 6, valve 9 which controls flow of fuel from the feed bowl 8 is controlled by the lever 43 which is actuated by the accelerator pedal 35 through suitable linkages or other connections indicated diagrammatically at 44.

As shown in Fig. 6, the lever 25 which controls the valve 21 is connected with the accelerator pedal 35 for simultaneous actuation with the throttle valve 33 and the valve 9 by a suitable linkage shown diagrammatically at 45.

As shown in Fig. 3, the superheater 13 includes a cylindrical double walled member 47 closed at its ends by the threaded plugs 48 and extending across a widened part of the exhaust conduit 14. The member 47 is divided by internal partitions into three annular chambers 49, 50 and 51. Fuel vapors or liquid are led into the first chamber 49 through the fuel feed line 10 and thence by the connecting conduits 52 through the successive chambers 50 and 51 and finally to the continuation of the fuel feed line 10.

Various changes in the details of the arrangements and the construction of the individual elements may be made without departing from the scope of the invention, which is not to be deemed as limited otherwise than as indicated by the scope of the appended claims.

I claim:

1. In a system for generating and supplying superheated vapors of liquid fuel to an internal combustion engine having intake and exhaust manifolds, a carburetor and a throttle valve; in combination, means for supplying liquid fuels of different vaporizing characteristics to the engine comprising two sources of fuel, means for conducting fuel from one of said sources directly to said carburetor, a fuel feed bowl connected with both of said sources of fuel, a heat exchanger having fluid flow connections with said exhaust manifold and said feed bowl whereby liquid fuel from said feed bowl is brought into heat exchange relation to exhaust gases passed through said exhaust manifold and superheated, a fuel feed line for conducting superheated fuel vapors from said heat exchanger to said intake manifold without previous mixing with air passing through said carburetor, a valve controlling flow of fuel from said feed bowl through said feed line to said heat exchanger, a second valve interposed in said feed line between said heat exchanger and the outlet from said fuel feed line, and means responsive to movements of the accelerator lever of said engine for actuating said second valve in coordinated relation with movements of the throttle valve when operating under load conditions.

2. In a system for generating and supplying superheated vapors of liquid fuel to an internal combustion engine having intake and exhaust manifolds, a carburetor, a throttle valve controlling flow of fuel from the carburetor to the intake manifold, and an accelerator lever operatively connected with said throttle valve; in combination, means for supplying liquid fuels of different vaporizing characteristics to the engine comprising two sources of fuel, means for conducting fuel from one of said sources directly to said carburetor, a fuel feed bowl connected with both said sources of fuel, a heat exchanger in heat receiving relation to the exhaust gases flowing through the exhaust manifold and the exhaust pipe leading therefrom, a feed line connected with said fuel feed bowl for leading fuel therefrom to said heat exchanger, a feed line for conducting the superheated fuel vapors generated in said heat exchanger to said intake manifold without previous mixing with air for combustion led thereto from said carburetor, and means actuated by the accelerator lever for controlling the flow of superheated fuel vapors from said heat exchanger to said engine.

3. In a system for generating and supplying superheated gasiform vapors of a heavy liquid fuel to a carburetor type internal combustion engine during periods when said engine is operating under load conditions and for supplying a light liquid fuel to said engine during idling periods and in starting, said engine having an intake manifold, a carburetor connected therewith, a throttle valve controlling flow through the carburetor to the intake manifold, an exhaust manifold, and an accelerator for the engine; in combination, means for supplying liquid fuels of different vaporizing characteristics to the engine comprising two sources of fuel, means for conducting fuel from one of said sources directly to the carburetor and to an idling jet discharging into the intake manifold intermediate the throttle valve and the fuel intake ports of said engine, a fuel feed bowl connected with both of said sources of fuel, a heat exchanger having passages therethrough in communication with said exhaust manifold, a fuel feed line connected to said feed bowl and at its opposite end terminating in a pipe extending lengthwise of the inlet pipe of the intake manifold and discharging into the intake manifold, said line having an intermediate portion thereof traversing said exhaust manifold and said heat exchanger in series, a valve controlling flow of fuel through said fuel line from said feed bowl to said heat exchanger, a second valve in said fuel line adjacent its point of entry into said inlet pipe of said intake manifold, and means responsive to movements of the accelerator for actuating the throttle valve and said second valve simultaneously in coordinated relation when operating under load conditions.

LIBERTO ALFONSO SERRANO.